United States Patent [19]
Knowlson

[11] Patent Number: 6,108,786
[45] Date of Patent: Aug. 22, 2000

[54] MONITOR NETWORK BINDINGS FOR COMPUTER SECURITY

[75] Inventor: Kenneth L. Knowlson, Portland, Oreg.

[73] Assignee: Intel Corporation, Santa Clara, Calif.

[21] Appl. No.: 08/845,598

[22] Filed: Apr. 25, 1997

[51] Int. Cl.[7] .................................................. G06F 12/14
[52] U.S. Cl. ........................ 713/200; 713/151; 713/152
[58] Field of Search ........................ 395/186, 187.01, 395/188.01, 200.59, 200.43, 200.68, 200.79, 200.8; 380/4, 25, 30; 713/151, 152, 200, 201, 202; 709/229, 213, 238, 249, 250

[56] References Cited

U.S. PATENT DOCUMENTS

| | | | |
|---|---|---|---|
| 5,414,833 | 5/1995 | Hershey et al. | 395/187.01 |
| 5,550,984 | 8/1996 | Gelb | 713/201 |
| 5,712,973 | 1/1998 | Dayan et al. | 396/186 |
| 5,742,758 | 4/1998 | Dunham et al. | 395/186 |
| 5,892,903 | 4/1999 | Klaus | 713/201 |

*Primary Examiner*—Robert W. Beausoliel, Jr.
*Assistant Examiner*—Pierre E. Elisca
*Attorney, Agent, or Firm*—Blakely, Sokoloff, Taylor & Zafman LLP

[57] ABSTRACT

A method and apparatus for securing a computer from unauthorized access via the Internet. The binding monitor service detects when an unauthorized protocol, typically a non-Internet protocol has a binding to an adapter such as an external network interface connector. When such a binding is detected, an alert is generated alerting the user or hardware to take care of the potential security breach.

20 Claims, 4 Drawing Sheets

MONITOR NETWORK BINDINGS FOR COMPUTER SECURITY

BACKGROUND OF THE INVENTION

1. Field of the Invention

The present invention relates generally to computer systems. More particularly, the present invention relates to computer security.

2. Description of Related Art

Recent advances in computer and networking technology have resulted in increasing interest in the Internet resulting in an increase in the number of private intranets being deployed. An important concern in securing private intranets is preventing unauthorized access via Internet connections. One method of preventing unauthorized access is through the use of a fire wall. In general, a fire wall is a gate keeping computer that is connected between the Internet and the private intranet. The firewall protects the private intranet by filtering traffic to and from the Internet based on network policies. Typically, the fire wall provides a single check point where network traffic can be audited. Most firewalls can be classified as either a packet filtering firewall or a proxy based application gateway firewall.

Packet filtering fire walls ("packet filters") are typically implemented in routers. The routers use tables to indicate communications protocols allowed into and out of a particular network. Such packet filters drop, reject or permit packets of information based on destination, address, source address and application port numbers. Packet filters do not maintain context or understand the applications they are dealing with. They make decisions purely by looking at Internet Protocol ("IP") headers and interpreting the rules they are programmed to follow. The reliance of packet filters on header information allows an unauthorized user to mimic the IP addresses of trusted machines and thereby gain unauthorized access. Packet filtering fire walls are thus susceptible to security breaches.

A second type of fire wall, a proxy based application gateway fire wall (also known as an application fire wall or a proxy fire wall) runs programs (called proxies or proxy software) that secure information flowing through a gateway. All Internet traffic is funneled through a gateway, controlled by the proxy software. The proxy software transfers the incoming information to an internal network based on the access rights of individual users. Because proxy software is typically an application program, it makes its decision based on context, authorization and authentication rules and does not depend on the IP address alone. Typically, proxy fire walls operate at the highest level of the protocol stack. Thus, they allow a private intranet systems analyst to implement security policies based on a wide range of defensive measures.

As will be seen, the present invention describes an improved method for implementing a fire wall.

SUMMARY OF THE INVENTION

A method and apparatus for securing a computer from unauthorized access. A binding monitoring service detects when an unauthorized protocol has a binding to an adapter. When such a binding is detected, an alert is generated.

BRIEF DESCRIPTION OF THE DRAWINGS

The advantages of the present invention will become more readily apparent to those ordinarily skilled in the art after reviewing the following detailed description and accompanying drawings, wherein.

DETAILED DESCRIPTION OF THE INVENTION

A system is described which includes a monitor binding service for determining when unwanted protocols have achieved a binding to an external adapter or external network interface connector (external NIC). For purposes of this invention, a binding is defined to be a routing rule between a first protocol layer and a second protocol layer, thereby allowing information transfer between the two protocol layers. A binding can be a direct binding between an adapter and a protocol or an indirect binding between a protocol and an adapter via an immediate protocol such as Transmission Control Protocol/Internet Protocol (TCP/IP). An adapter is defined to be a communication device which enables connection to a network, typically an internal or external modem or a network interface card.

In order to secure a local area network (LAN), the present invention disables all services or unauthorized protocol bindings to an adapter connected to the Internet. Typically, the only authorized protocol is TCP/IP. A monitoring system may be included such that if a binding between the adapter and an unauthorized protocol (or an application protocol bound to TCP/IP) is established, an alert is generated. The alert may be transmitted to a system administrator. Alternately, the alert may result in the automatic disablement of the binding between the external NIC and the unauthorized protocol.

In the following description, numerous references to specific details are set forth. In particular many of the examples will use the WINDOWS 95™ and WINDOWS NT™ operating system from Microsoft Corporation of Redmond, Wash. The example will also illustrate the system using an external NIC as the adapter. The examples are used to provide a thorough understanding and enable a clear presentation of the present invention. However, one skilled in the art will recognize many variations of the Applicant's invention which may be practiced without these specific details.

Figure 1:
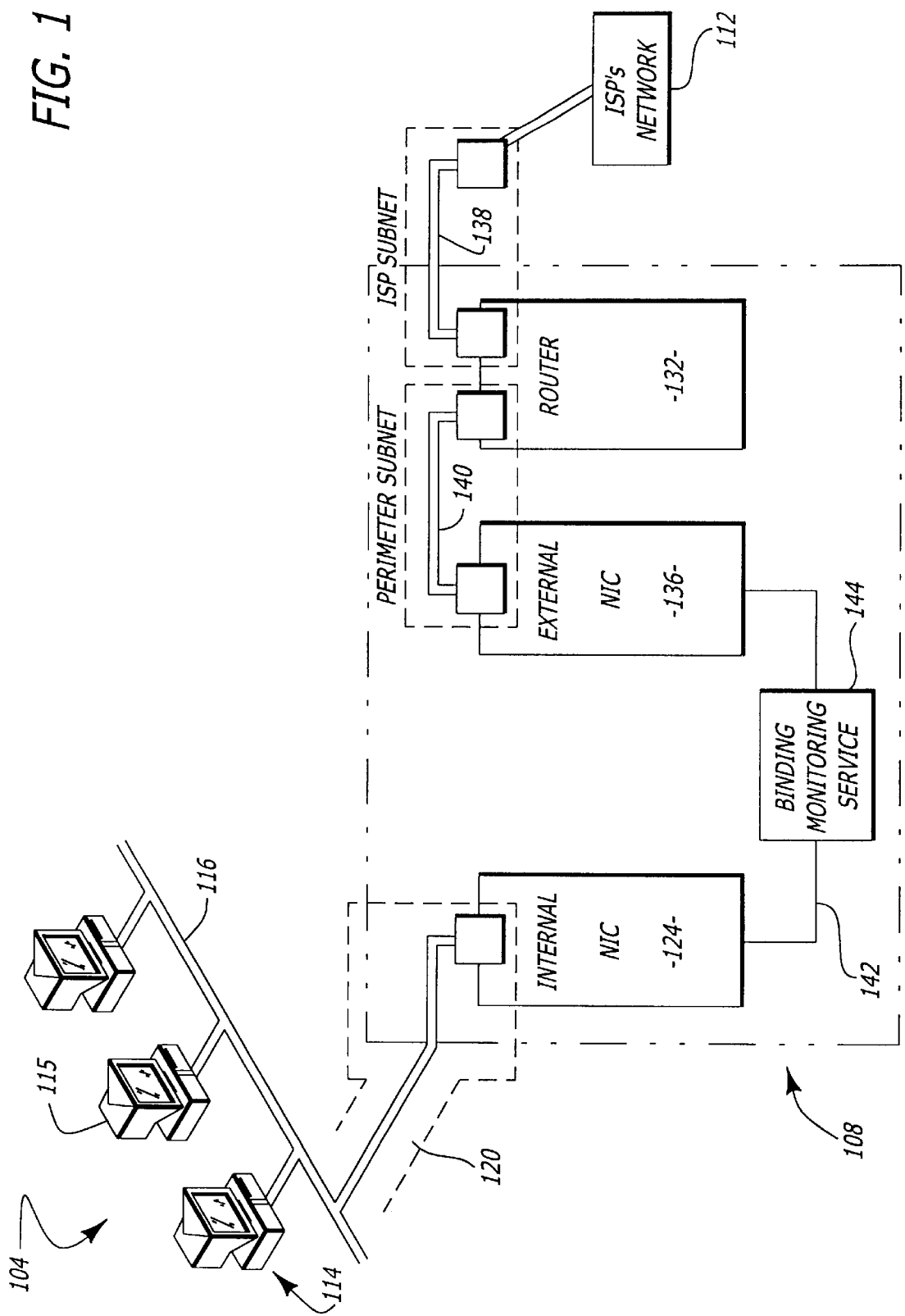
FIG. 1 is a block diagram of the hardware used in implementing the fire wall system of the present invention.

FIG. 1 illustrates an overall system in which a local area network (LAN) 104 is coupled via an Intranet server system 108 to an Internet service provider network (ISP network) 112. LAN 104 may include a number of computers 114, 115 coupled to a common network 116. LAN 104 may be connected via a LAN subnet 120 to an internal adapter such as an internal network interface card (internal NIC) 124.

In the embodiment shown, an ISP subnet 138 couples the ISP network 112 to a router 132. A terminal of the router 132 is coupled to an adapter, in the illustrated embodiment an external NIC 136, via a perimeter subnet 140, typically an ethernet connection. Information is exchanged between the external NIC and the internal NIC via a communications connection 142 monitored by binding monitoring service 144. In one embodiment, the binding monitoring service is implemented in proxy software. The binding monitoring service 144 monitors the connection 142 to maintain a fire wall between the external NIC 136 and the internal NIC 124 and prevent unauthorized access to the internal NIC 124 and computers 114, 115 coupled to LAN 104.

The binding monitor service 144 monitors connection 142 by periodically checking to make sure that only authorized protocols have a binding to the network adapter or the external NIC 136 providing access to the Internet. If a protocol other than an authorized protocol has a binding to the external NIC 136, the system administrator is notified of the security violation.

In order to determine whether only authorized protocols have a binding to the external NIC 136, the binding monitor service 144 determines the relationship among the various computer components and pieces of software. In one embodiment of the present invention, the binding monitor service 144 determines the relationships by checking information in a registry. One registry particularly suitable for such checking is generated by the WINDOWS NT™ and WINDOWS 95™ operating systems from Microsoft Corporation.

In WINDOWS NT, when a network component is installed, status information is added to a registry. The network component may include both software and service portions. The software portion of the network components are registered in a software registry section. Service portions of the network component describing the various protocol interconnects are registered in a service registry area of the registry. The registry further includes information about bindings for network components and dependency handling. Typically, the registry is organized into categories called subkeys such that each network component listed in the registry is associated with subkeys in the software registry section and corresponding subkeys in the service registry section.

For networking software in a computer to operate properly, different pieces of the software must be loaded and the relationship between the software and other components must be established. Networking software is software which interfaces with the other computer components on a network. The relationships or routing rules between protocols are the bindings of the system. The bindings may be stored in a registry as done in the WINDOWS NT™ operating system. In one embodiment of the present invention, the monitor binding service 144 checks the information in a WINDOWS NT™ registry to determine a complete set of optimal bindings among an ensemble of configured network components. A typical WINDOWS NT™ registry includes: 1) a set of network components to be configured, 2) the types of network components in this set, 3) the constraining parameters for the network components and their bindings, 4) the possible bindings that could occur, and 5) the proper way to inform each network component about its bindings.

By way of example, a typical network circuit card operating in the Windows environment may generate four distinct subkeys in the registry. One of these subkeys, is the HKEY_LOCAL_MACHINE\SYSTEM\CURRENT CONTROL SET\SERVICES subkey or "control subkey". The control subkey is the service registration area that contains the information used to load a network component into memory. Thus, the control subkey contains certain required information such as the location of the executable file, the service type, and its start criterion.

In WINDOWS NT™, the control subkey is established during system start-up to check the binding information for each protocol. If a binding is found, a linkage subkey is created and information regarding the binding is stored under the subkey. Thus, in one embodiment of the current invention, the binding monitor service 144 determines services or bindings between adapters such as the external NIC and protocols by looking at the information stored under the control subkey file.

Figure 2:
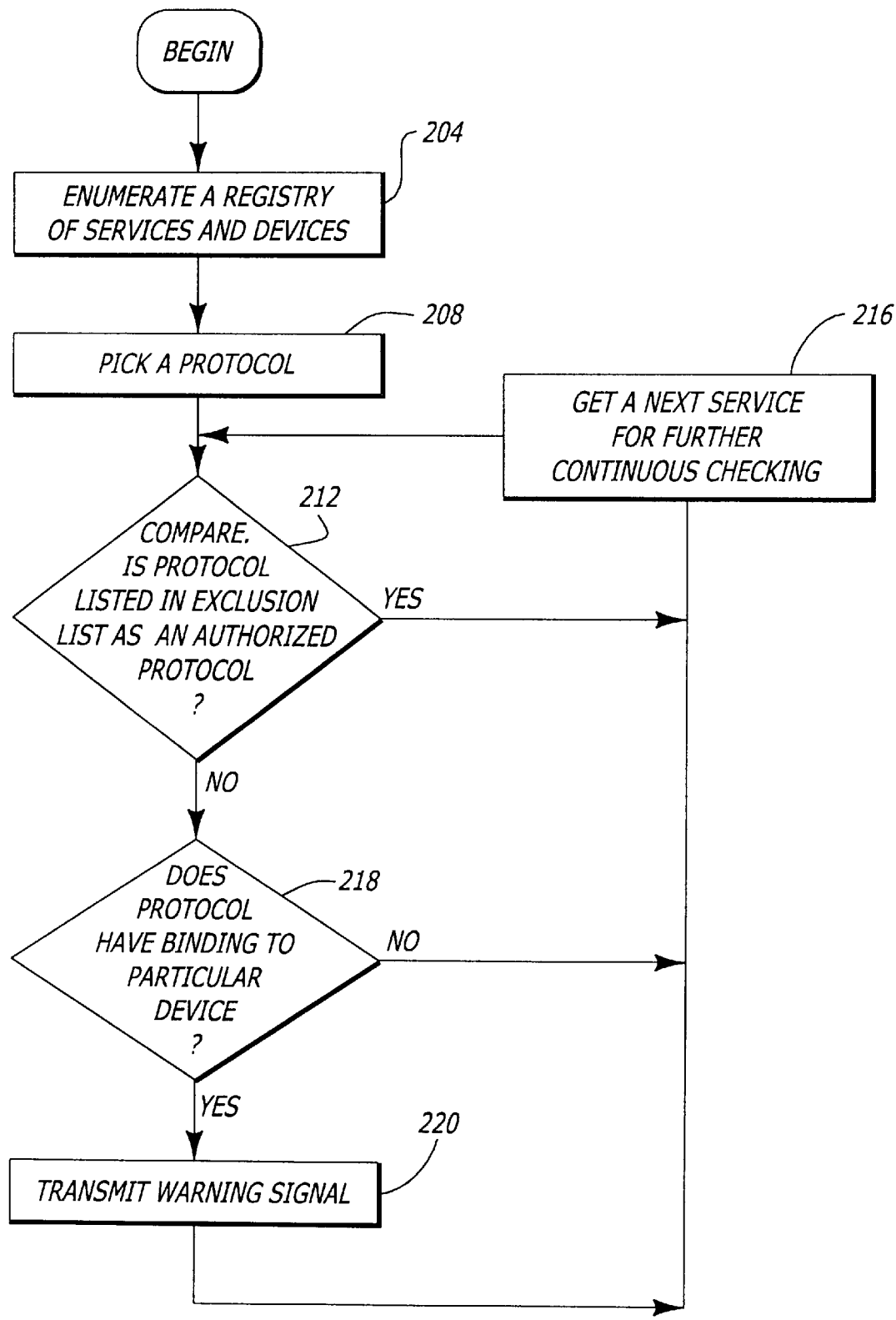
FIG. 2 illustrates a flow diagram showing one method of implementing the fire wall of the present invention.

FIG. 2 is a flow diagram illustrating one method of using the linkages and subkeys in a registry to determine the bindings between protocols and adapters. In step 204, the services and devices of a computer system or LAN are enumerated in a registry. In one embodiment, the enumeration of services and devices is done by the operating system software. As previously described, the control subkey of WINDOWS NT provides such an enumeration. Originally, this registry was used as a database for the operating system and applications. For example, during initialization, the registry provides start-up information for the operating system. The registry is also used for component object-model registration to indicate how and where to start system components. By using the registry information to maintain a fire wall, re-generation of the information can be avoided. Alternately, the enumeration of services and devices may be generated by the monitor binding service or a third piece of software separate from either the operating system or the monitor binding service.

In one embodiment of the present invention, the monitor binding service consecutively analyzes each service in a computer to determine whether the bindings to a particular device, usually to an external NIC, may breach LAN security. In step 208, the proxy software chooses a service to be analyzed. In step 212, the monitor binding service compares the chosen service with services in an exclusion list. The exclusion list enumerates services that do not have to be analyzed because they are authorized services. Authorized services are defined to be services which may have a binding to the particular device being tested, typically an external NIC. If a service is listed in the exclusion list as an authorized service, the service does not have to be checked and the monitor binding service chooses the next protocol for checking in step 216. In one embodiment, the external NIC is the particular device tested and TCP/IP is the only protocol on the exclusion list. If the monitor binding service determines that a protocol not listed on the exclusion list has a binding to the particular device in step 218, an alert or a warning signal is transmitted in step 220. The warning may alert a system administrator. Alternatively the warning may automatically disable the bindings. If in step 218, the monitor binding service determines that a protocol not on the exclusion list has no binding to the particular device, the next service is chosen for analysis.

The previous described embodiment is appropriate for analyzing a single device. In an alternate embodiment shown in FIG. 3, the method of the present invention may also determine bindings to other devices besides the one particular device. In an alternate embodiment, the exclusion list enumerates devices and authorized protocol pairs. In such a configuration, multiple protocols including "authorized" protocols and multiple devices are checked for appropriate bindings. The exclusion list may thus include information limiting protocols to a specific device or a plurality of specific devices. For example, the external NIC driver might be included in an exclusion list as the only particular device which can be coupled to the authorized protocol of TCP/IP.

Figure 3:
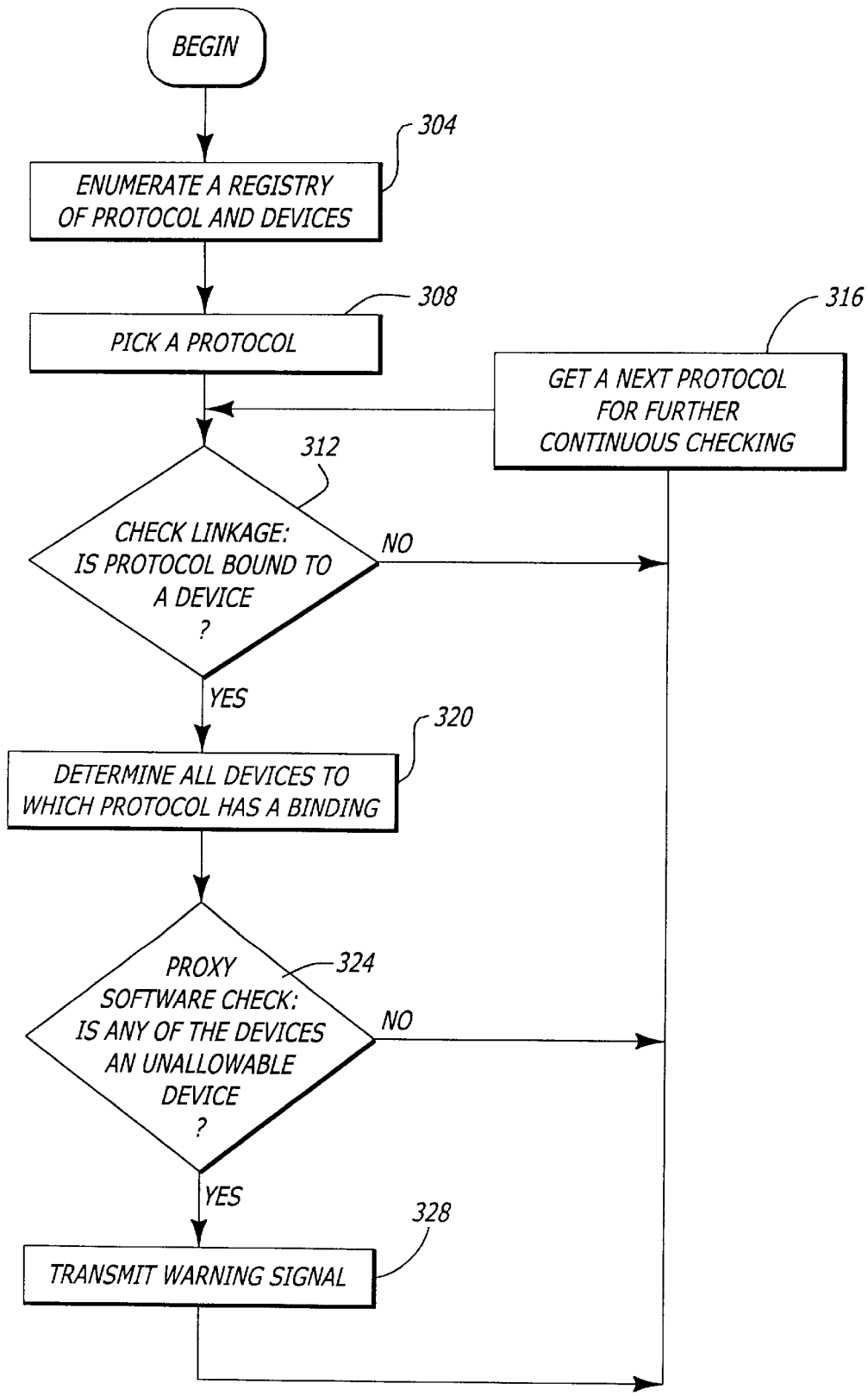
FIG. 3 illustrates a flow diagram showing a second embodiment of the present invention for implementing a firewall.

The alternate embodiment described is outlined in FIG. 3. In step 304, a registry of protocol and device bindings are generated. If multiple protocols and multiple devices are to be analyzed the exclusion list enumerates permissible bindings between multiple devices and protocols. If a binding between a chosen protocol and a selected particular device is not included on the exclusion list corresponding to the particular device being analyzed, the protocol is an unauthorized protocol for the particular device.

In step 308, a protocol is chosen for analysis. In step 312, the monitor binding service checks linkages in the registry to determine if the chosen protocol has a binding or service to any devices. Protocols that have no associated bindings do not need to be checked further. Thus, protocols without bindings are not checked and the monitor binding service chooses the next protocol as the chosen protocol for further checking in step 316.

In step 312, if the linkages indicate that the chosen protocol has a binding to a particular device being analyzed, then the monitor binding service determines all devices to which the chosen service is bound in step 320. Determining all devices to which the chosen service has a binding may be accomplished by checking the registry. In step 324, the system checks the list of devices coupled to the service and determines if any of the devices is an "unauthorized" device. An unauthorized device is a device which should not have a binding to the chosen protocol. In a typical embodiment, the most common unauthorized device is the external NIC.

If no bindings exist between an unauthorized device and the chosen protocol under analysis, the monitor binding service returns to step 316 and chooses the next protocol for further analysis. The process of choosing a protocol, analyzing the protocol and choosing the next protocol continues until all protocols and associated bindings have been analyzed. After all services are analyzed, the system cycles and repeatedly analyzes the services to assure that an unpermitted binding which could violate the fire wall is not established.

If in step 324, the monitor binding service determines that a chosen protocol is coupled to an unauthorized device, an alert or warning signal is transmitted alerting either a user or an automatic system of the security breach in step 328. Automatic systems may receive the warning signal and automatically disable the binding between the device and the service which generated the warning signal.

Figure 4:
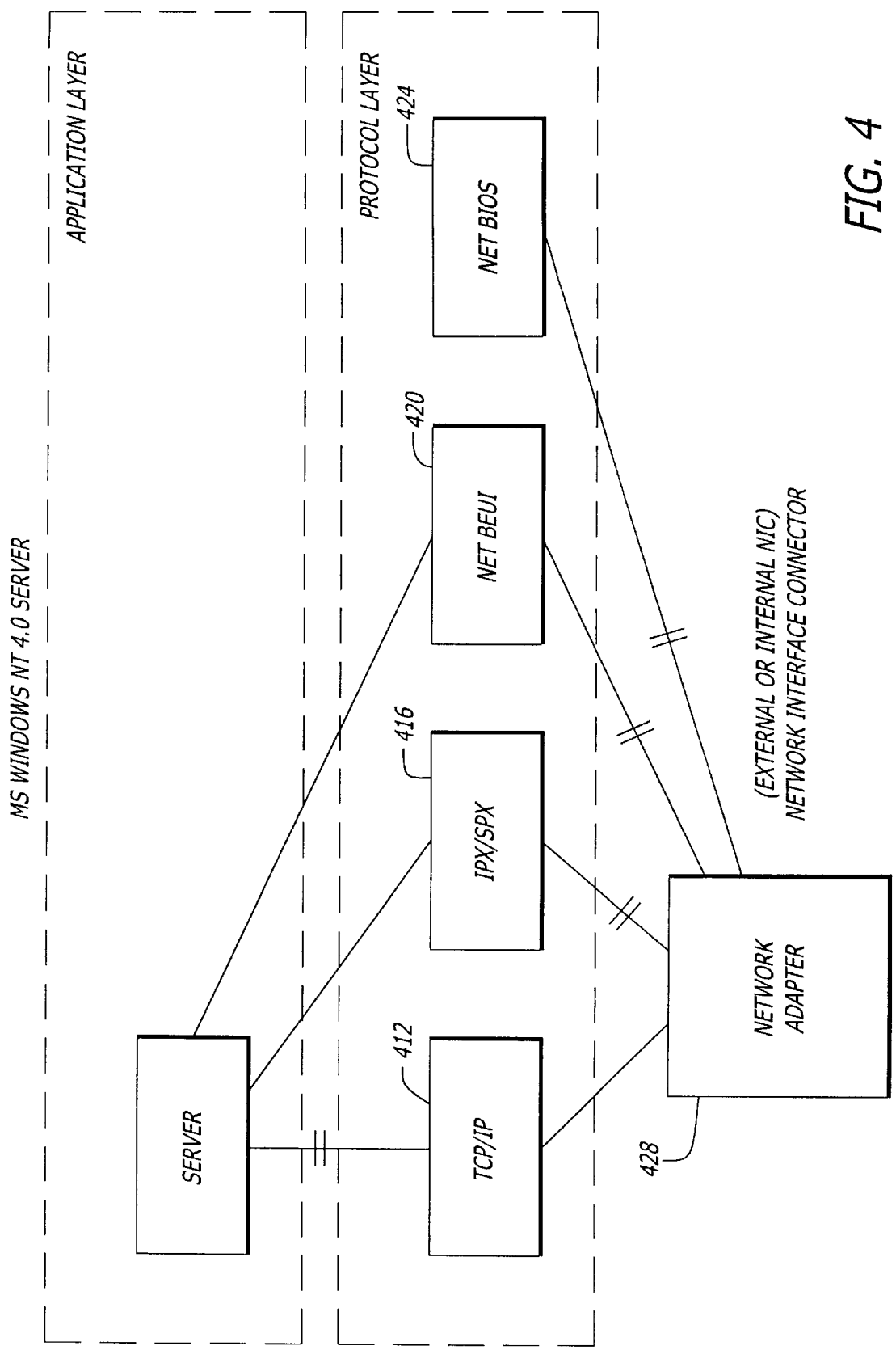
FIG. 4 illustrates a system diagram showing the protocols and how they connect the server to the external network interconnect connector.

FIG. 4 illustrates an overview of various potential protocols and the interconnections which may result. The server 404 in the applications layer is coupled to the various protocols in a protocol layer 408 as shown. The protocols in the protocol layer 408 include but are not limited to the Internet TCP/IP 412, the NOVEL IPX/SPX 416 the Net Beui 420 and Net Bios 424. As illustrated, all these protocols except TCP/IP are connected to the server. In the illustration, only the TCP/IP 412 protocol is allowed to have a binding to the external NIC 428.

While certain exemplary embodiments have been described and shown in the accompanying drawings and specification, it is to be understood that such embodiments are merely illustrative of and not restrictive on the broad invention. It is noted that the same results outlined by the flow charts may be achieved by a variety of different comparisons and permutations. Thus, the invention is not to be limited to the specific constructions and arrangements shown and described, since various other modifications may occur to those ordinarily skilled in the art.

What is claimed is:

1. A method for securing a computer from unauthorized access comprising:

detecting a binding between an unauthorized protocol and an adapter using a binding monitor service; and generating an alert by the monitor binding service upon detection of the binding that the unauthorized protocol has a binding to the adapter.

2. The method of claim 1 wherein the detecting by the binding monitor service further comprises:

checking a registry for linkages; and comparing the linkages within the registry with an exclusion list.

3. The method of claim 2 further comprising:

disconnecting the binding when the alert is received.

4. The method of claim 2 wherein the registry is maintained by an operating system.

5. The method of claim 2 further comprising:

generating an exclusion list listing protocols which may have a binding to the adapter.

6. The method of claim 5 wherein the adapter is an external network interface connector and the exclusion list includes TCP/IP as the only permissible binding to the adapter.

7. The method of claim 2 wherein said checking and comparing acts are repeated at periodic intervals.

8. The method of claim 1 wherein the adapter is an external network interface connector.

9. The method of claim 1 wherein the binding is an indirect binding.

10. A method for securing a computer system from unauthorized access comprising:

enumerating in a registry protocols and devices in use in a computer network;

determining by a monitor binding service a corresponding linkage key for each protocol not in an exclusion list; and generating an alert if the corresponding linkage key is associated with an adapter.

11. The method of claim 10 wherein said exclusion list includes a TCP/IP protocol.

12. The method of claim 10 further comprising:

disconnecting the protocol associated with the linkage key which caused the transmitting of the warning signal.

13. The method of claim 10 wherein said enumerating and said determining is repeated at periodic intervals.

14. The method of claim 10 further comprising:

alerting a monitor program to display a warning on a screen when the warning signal is received.

15. A system for preventing unauthorized entry into a computer network, comprising:

a router for connecting to the Internet;

an external network interface connector coupled to said router;

an internal network interface connector coupled to said external network interface connector, said internal network interface connector coupled to a local area network; and a binding monitor service managing the computer network, the binding monitor service detects when an unauthorized protocol has a binding to an adapter and transmits an alert when the binding is detected.

16. The system of claim 15 wherein the system further comprises:

a registry file including binding between protocols and devices, said binding monitor service determines whether said external network interface connector is bound to a non-Internet protocol by checking said registry file.

17. The system of claim 15 wherein the system further comprises:

an exclusion list, which is compared to the registry file, the exclusion list including services which do not need to be examined because they may be bound to the external network interface connector.

18. The system of claim 16 wherein said registry is part of an operating system running on the computer managing the computer network.

19. The system of claim 15 wherein the monitor binding service manages an ethernet connection coupling the external network interface connector to the internal network interface connector.

20. A system for preventing unauthorized entry into a computer network, comprising:

a connection for connecting to a wide area network;

an external adapter coupled to said connection;

an internal adapter coupled to said external adapter, said internal adapter coupled to a local area network; and a binding monitor service executing on a computer managing the computer network, the binding monitor service detects when an unauthorized protocol has a binding to the external adapter and generates an alert when the binding is detected.

* * * * *

UNITED STATES PATENT AND TRADEMARK OFFICE
CERTIFICATE OF CORRECTION

PATENT NO.    : 6,108,786
DATED         : August 22, 2000
INVENTOR(S)   : Knowlson It is certified that error appears in the above-identified patent and that said Letters Patent is hereby corrected as shown below:

Column 2,
Line 14, delete "monitor binding" and insert -- binding monitor --.

Column 3,
Line 45, delete "monitor binding" and insert -- binding monitor --.

Column 4,
Lines 22, 30, 38, 41, and 47, delete "monitor binding" and insert -- binding monitor --.
Line 25, delete "monitor" and insert -- binding --.
Line 26, delete "binding" and insert -- monitor --.

Column 5,
Lines 7, 11, 16, 26, and 36, delete "monitor binding" and insert -- binding monitor --.

Column 6,
Lines 1 and 30, delete "monitor binding" and insert -- binding monitor --.

Signed and Sealed this

Fourth Day of December, 2001

Attest:

NICHOLAS P. GODICI
Attesting Officer    Acting Director of the United States Patent and Trademark Office